(12) United States Patent
Ohashi

(10) Patent No.: US 6,983,302 B1
(45) Date of Patent: Jan. 3, 2006

(54) DOCUMENT MANAGING CONTROL SYSTEM AND COMPUTER-READABLE RECORDING MEDIUM TO RECORD DOCUMENT MANAGING CONTROL PROGRAM

(75) Inventor: Tadashi Ohashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 657 days.

(21) Appl. No.: 09/698,200

(22) Filed: Oct. 30, 2000

(30) Foreign Application Priority Data

Mar. 13, 2000 (JP) .............................. 2000-069386

(51) Int. Cl.
*G06F 15/173* (2006.01)

(52) U.S. Cl. .................. 709/203; 709/220; 709/230; 709/237; 709/248; 702/183; 707/9; 707/10; 707/200; 707/205; 714/4; 715/530; 715/748

(58) Field of Classification Search ................ 709/220, 709/222, 224, 230, 237, 248, 203; 702/183; 707/9, 10, 200, 205; 714/4; 715/530, 748; 706/1, 5

See application file for complete search history.

(56) References Cited

U.S. PATENT DOCUMENTS

| | | | | |
|---|---|---|---|---|
| 5,548,729 A | * | 8/1996 | Akiyoshi et al. ........... | 709/222 |
| 5,966,509 A | * | 10/1999 | Abe et al. ....................... | 714/4 |
| 6,092,100 A | * | 7/2000 | Berstis et al. ................ | 709/203 |
| 6,125,391 A | * | 9/2000 | Meltzer et al. ............. | 709/223 |
| 6,128,655 A | * | 10/2000 | Fields et al. ................. | 709/219 |
| 6,138,119 A | * | 10/2000 | Hall et al. ..................... | 707/9 |
| 6,167,448 A | * | 12/2000 | Hemphill et al. ........... | 709/224 |
| 6,463,470 B1 | * | 10/2002 | Mohaban et al. ........... | 709/223 |
| 6,505,244 B1 | * | 1/2003 | Natarajan et al. ........... | 709/223 |
| 6,556,951 B1 | * | 4/2003 | Deleo et al. ................. | 702/183 |

FOREIGN PATENT DOCUMENTS

JP SHO 62-212831 A 9/1987

* cited by examiner

*Primary Examiner*—Saleh Najjar
*Assistant Examiner*—Michael Won
(74) *Attorney, Agent, or Firm*—Staas & Halsey LLP

(57) ABSTRACT

The present invention aims to register, receive or make reference to the component easily, accurately and at a low cost. The present invention comprises a manufacturer server for storing a component information with respect to a wholeness of a hardware and a firmware for composing a product, a rule server for storing a registration rule information upon registering the component information in the manufacturer server and a registration system client for registering the component information in the manufacturer server on the basis of the registration rule information.

11 Claims, 15 Drawing Sheets

FIG.4A

| PARTS NUMBER | PARTS NAME | EDITION NUMBER | MANUFACTURER |
|---|---|---|---|
| QXY118 | MODULE A | 0101 | N OPERATION |
| TX220-2 | MODULE B | 0102 | MADE IN ABC ELECTRICAL CORPORATION |
| 7800A | DEVICE DRIVER | 10A0 | MADE IN XYZ SYSTEMS CORPORATION |

FIG.4B

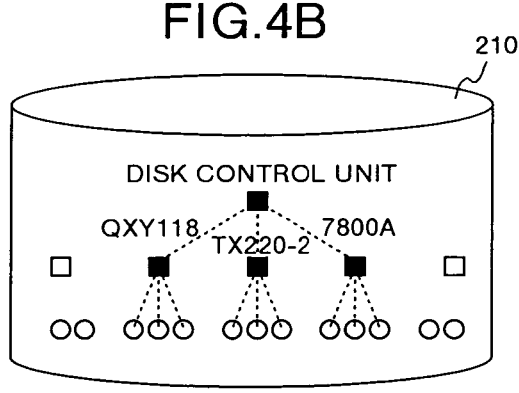

FIG.4C

```
<PARTS NUMBER>QXY118</PARTS NUMBER>
<PARTS NAME>MODULE A</PARTS NAME>
<EDITION NUMBER>0101</EDITION NUMBER>
<MANUFACTURER>N OPERATION </MANUFACTURER>
```

```
<PARTS NUMBER>TX220-2</PARTS NUMBER>
<PARTS NAME>MODULE B</PARTS NAME>
<EDITION NUMBER>0102</EDITION NUMBER>
<MANUFACTURER>MADE IN ABC ELECTRICAL
CORPORATION</MANUFACTURER>
```

```
<PARTS NUMBER>7800A</PARTS NUMBER>
<PARTS NAME>DEVICE DRIVER</PARTS NAME>
<EDITION NUMBER>10A0</EDITION NUMBER>
<MANUFACTURER>MADE IN XYZ SYSTEMS
CORPORATION</MANUFACTURER>
```

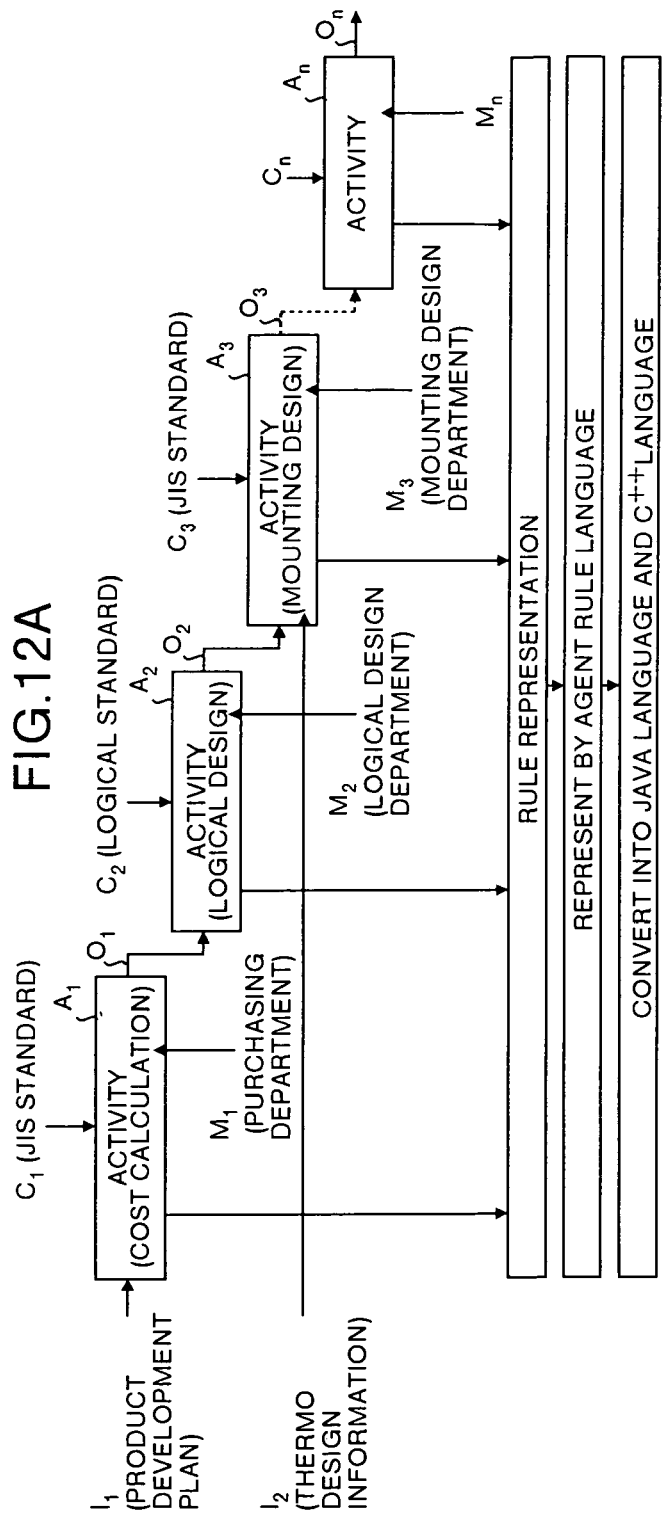
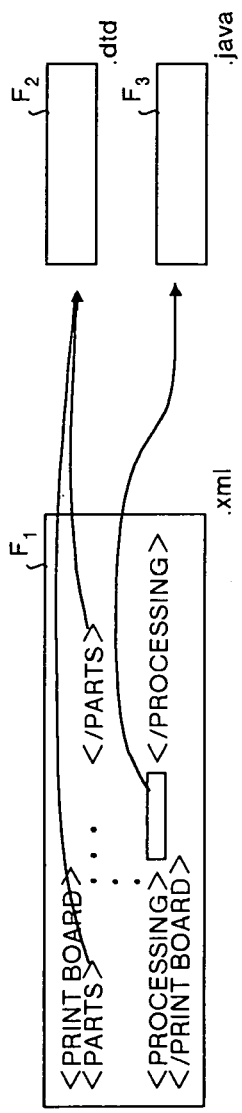
FIG.12A
FIG.12B

DOCUMENT MANAGING CONTROL SYSTEM AND COMPUTER-READABLE RECORDING MEDIUM TO RECORD DOCUMENT MANAGING CONTROL PROGRAM

FIELD OF THE INVENTION

The present invention relates to a component managing control system and a computer-readable recording medium to record a component managing control program, which are preferable to be used for a managing control of a document such as a source code and an object code of a firmware, a design drawing and specification form of a hardware or the like (hereinafter, collectively means a component). The present invention particularly relates to the component managing control system and the computer-readable recording medium to record the component managing control program, which are capable of registering, receiving and referring a component easily, accurately and at a lower cost.

BACKGROUND OF THE INVENTION

A manufacturer for manufacturing a device and a unit requires various and enormous components including a source code and an object code of a firmware (program) in addition to a document such as a design drawing, a specification form and a contract document or the like in a series of a developing process, a designing process, a manufacturing process, an inspecting process, a shipping process, a delivering/setting process and an operation/maintenance process by the user.

Accordingly, the manufacturer consolidates and centrally controls various and enormous components with one bulk server. However, since registration of the component to the bulk server is performed manually, it has a problem administratively such that rules for registration or the like are not observed. On this account, means and a method to solve this problem has been anxiously expected so far.

Nowadays, a hardware and a firmware are mixed to be mounted in most of electronic appliances. Further, upon manufacturing the electronic appliances, the hardware for composing the electronic appliance is designed in addition to designing the firmware in a design department. Specifically, in the design department, various documents (components) with respect to a hardware such as a master component drawing, a slave component drawing, a logical circuit drawing, a print board mounting drawing, a hardware test specification or the like are generated.

The above master component drawing depicts a list of the electronic appliance's component (component part) and the above slave component drawing depicts a construction of the component, which is illustrated in the master component drawing. Thus, the component has a layered construction such that the slave component is laid under the master component. The logical circuit drawing illustrates a logical circuit in the current device. The print board mounting drawing illustrates a status that respective parts are mounted on a print board. The hardware test specification illustrates specifications with respect to each test such as checking of the operation in the assembled apparatus or the like. Further, in the design department, the source code and the object code of the firmware (component) are generated.

The above described various components with respect to the hardware and the firmware are managed in a management department to be delivered to a factory or the like according to need. Further, in the case that the component is revised due to change of design, the revised number is managed individually in the managing department.

Conventionally, a component managing control system of a client/server type is employed as means for managing a component. FIG. 13 is a block diagram showing a schematic constitution of a conventional component managing control system. In FIG. 13, a work procedure instruction sheet 10 describes detailed registration rules for registering the component in a server 14. A registrant refers to these registration rules. A registration system client 11 is set in the managing department to be connected to a network 13. This registration system client 11 intends to register the component in the server 14 via a browser 12.

The server 14 is connected to the network 13 to store the registered component and make reference to or receive the component registered in a reference system client 16 or a reception system client 18. A router 15 is connected to the network 13 to route a packet. The reference system client 16 makes reference to the component registered in the server 14 with a browser 17. The reception system client 18 receives the component registered in the server 14 with browser 19.

In the above construction, the registrant makes reference to the work procedure instruction sheet 10 and a operates the registration system client 11 according to the registration rules to register the component in the server 14 on a screen of the browser 12. Hereinafter, the registrant repeats the registration operation, so that the server 14 stores various components.

On the other hand, at the side of the reference system client 16, the user makes reference to a work procedure instruction sheet (not illustrated), which defines detailed reference rules for referring to the component and operates the reference system client 16 to refer to a desired component registered in the server 14 on the screen of the browser 17. In the same way, at the side of the reception system client 18, a receiver makes reference to a work procedure instruction sheet (not illustrated), which defines detailed receipt rules for receiving the component and operates the reception system client 18 to receive a desired component registered in the server 14 on the screen of the browser 19.

FIG. 14 is a block diagram showing a specific constitution of a conventional component managing control system. In FIG. 14, a client 20 register, make reference to and receive the component as described above to be connected to a WAN (Wide Area Network) 21. In fact, pluralities of clients 20 are provided for registration, reference and receipt.

A registration procedure instruction sheet 22 describes detailed rules for registering the component in a bulk server 24, a polaris server 25 and a meta server 26. The registrant refers to these registration rules. A component 23 subjects to be registered, referred to and received and comprises the document (component) such as the above described source code, the object code of the firmware and a catalogue of parts, a manual or the like of the hardware.

The bulk server 24 stores a component itself to be connected to the WAN 21. The polaris server 25 centrally controls registration, reference and receipt of the component to be connected to the WAN 21. The meta server 26 stores a meta information for representing a layer construction (cross relation) between the registered components to be connected to the WAN 21.

In the above construction, the registrant makes reference to the registration procedure instruction sheet 22 and operates the client 20 according to the registration rules to register the component 23 in the bulk server 24 under the control of the polaris server 25 and register the meta information for representing the layer construction in the meta server 26. Hereinafter, the registrant repeats the registration operation, so that the bulk server 24 stores various components and the meta server 26 stores the meta information.

On the other hand, the user makes reference to a procedure instruction sheet (not illustrated), which defines detailed reference rules for referring to the component and operates the client 20 to refer to a desired component registered in the bulk server 24 on the basis of the meta information stored in the meta server 26 under the control of the polaris server 25. The receiver makes reference to a procedure instruction sheet (not illustrated), which defines detailed receipt rules for receiving the component and operates the client 20 to receive a desired component registered in the bulk server 24 on the basis of the meta information stored in the meta server 26 under the control of the polaris server 25.

FIG. 15 is an explanatory view illustrating a conventional rule applicable method with respect to designing and manufacturing of the commodities. In FIG. 15, a method for studying and improving the operation process and analyzing a workflow is illustrated. According to this method, all persons in charge of designing and manufacturing of the products interchange and supply the operation information to study and improve the operation process and analyze a workflow. In FIG. 14, a purchasing department $M_1$ applies a control information $C_1$ (JIS standard) with respect to a product development plan $I_1$ to calculate the cost as an activity $A_1$, and make the cost account into an output $O_1$.

Next, a logical design department $M_2$ receives the output $O_1$ on the basis of a control information $C_2$ (logical standard) to create a logical design as the activity $A_1$ and make a logical design drawing into an output $O_2$. Then, a mounting design department $M_3$ receives the output $O_2$ and a thermal design information $I_2$ to perform a mounting design on the basis of a control information $C_3$ (JIS standard) and make the mounting designing form into an output $O_3$. Hereinafter, the source code and the object code or the like of the firmware are outputted.

Then, a mounting design department $M_n$ receives the output $O_{n-1}$ (not illustrated) and makes the output $O_{n-1}$ into an activity $A_n$ to manufacture the product and make the result into an output $O_n$ (product). In this way, the activities $A_1$ through $A_n$ generate a document of a layer construction (the cost account, the logical design drawing and the mounting designing form or the like) and the object ode of the firmware or the like. This layer construction has a meta representation to be stored in the above described meta server 26 (see FIG. 14) as the meta information.

As described above, conventionally, the server 14 (see FIG. 13) and the bulk server 24 (see FIG. 14) store various and enormous components. Further, as described above, the server 14 and the bulk server 24 centrally control the registration, reference and receipt of the components and register, make reference to and receive them on the basis of unified registration rules, reference rules and receipt rules (hereinafter, simply referred to as a rule).

In the mean time, conventionally, with respect to one product, a component (the source code and the object code of the firmware and the logical design drawing or the like) is created, respectively in respective development departments, which are distributed in each location as well as the components are created in various enterprises by making good use of the outsourcing. Therefore, there is a trend toward that unified rules are difficult to be accurately applied to the plural components. Particularly, with respect to the component to be created in the enterprises by making good use of the outsourcing, the above trend is noticeable, since a unique rule (a drawing number and a format or the like) is applied there.

In other words, in a conventional component managing control system, it is necessary to forcedly apply unified rules to various and enormous components. Therefore, the component is not capable of being freely registered, made reference to and received, so that it can be said that the conventional component managing control system is a very cumbersome system.

Further, since the conventional component managing control system centrally controls the component, it is necessary to prepare a high performance system as a mass storage device and a mass server machine in order to large amount of components. This involves a problem that the conventional component managing control system requires a high cost.

Conventionally, with respect to one product, the plural components have layered constructions, so that it is required to understand the layered construction and the rules and register, make reference to and receive the component manually. Therefore, there is a problem such as an operational mistake and a longer operation time.

SUMMARY OF THE INVENTION

It is an object of the present invention is to provide a component managing control system and a computer-readable recording medium to record a component managing control program, which are capable of registering, receiving and referring a component easily, accurately and at a lower cost.

In order to attain the above object, a first aspect of the invention comprises a component information storage server (corresponding to a manufacturer server 180 of an embodiment to be described later) for a storing a component information with respect to a wholeness of a hardware and a firmware to compose a product, a rule information storage server (corresponding to a rule server 150 of the embodiment to be described later) for storing a rule information upon registering the component information in the component information storage server and a registration client (corresponding to a registration system client 100 of the embodiment to be described later), which is connected to the component information storage server and the rule information storage server via a network, for registering the component information in the component information storage server on the basis of the rule information, which is derived from the rule information storage server.

According to this invention, the registration client derives the rule information from the rule information storage server to register the component information in the component information storage server on the basis of this rule information. Accordingly, compared with a conventional case that the registrant makes reference to the registration rule, which is described on the document, and registers it, the registration of the component information is capable of being performed more easily and accurately.

A second aspect of the invention provides the component managing control system according to the first aspect, wherein the plural component information storage servers are provided and plural and various component information is distributed and stored in the plural component information storage servers, respectively.

According to this invention, the component information is dispersed to be stored in the plural component information storage servers. Therefore, compared with the conventional case for centrally storing the component information in one server, a required storage capacity of the storage device becomes smaller, so that the cost can be lowered.

A third aspect of the invention provides the component managing control system according to any one of the first aspect or the second aspect, which comprises a meta information storage server (corresponding to the embodiment to be described later), which is connected to the network, for storing a meta information having a layered construction of at least component information. Said registration client registers the meta information in the meta information storage server and registers the component information in the component information storage server.

According to this invention, at least a meta information having a layered construction of the component information is made to be stored in the meta information storage server so that the user is capable of easily and accurately registering the component information without considering the complicated layered construction.

A fourth aspect of the invention provides the component managing control system according to any one of the first to the third aspect, which comprises the registration client registers the component information, which is described by an XML.

According to this invention, the component information is capable of being described by an XML, so that various component information can be easily constructed due to the property of the XML.

A component managing control system according to the fifth aspect of the invention comprises a component information storage server for a storing a component information with respect to a wholeness of a hardware and a firmware to compose a product, a rule information storage server for storing a rule information upon making reference to/receiving the component information from the component information storage server and a reference/receipt client, which is connected to the component information storage server and the rule information storage server via a network, for making reference to/receiving the component information from the component information storage server on the basis of the rule information, which is derived from the rule information storage server.

According to this invention, the reference/receipt client derives the rule information from the rule information storage server to make reference to/receive the component information from the component information storage server on the basis of this rule information. Accordingly, compared with a conventional case that the registrant/receiptor makes reference to the reference/receipt rule, which is described on the document, and makes reference to/receives it, the reference/receipt of the component information is capable of being performed more easily and accurately.

A sixth aspect of the invention provides the component managing control system according to any one of the first to fifth aspect, which comprises rule verification means for verifying a deliberation result of a written rule, which is a source of the rule information, and registering a rule information in response to the verification result in the rule information storage server.

According to this invention, a deliberation result of a written rule as a source of the information rules is verified and the rule information in response to this verification result is made to be registered in the rule information storage server, so that the violation of the rule and the error or the like can be prevented compared with the case to register the information manually.

A seventh aspect of the invention provides the component managing control system according to any one of the first to sixth aspect, which comprises agent means for deducing the rule information.

According to this invention, the agent means deduces the rule information, so that the registration, reference or receipt of the component information is capable of being easily and accurately performed without a manpower.

An eighth aspect of the invention provides the component managing control system according to the seventh aspect, wherein the agent means evaluates the deduction result of the rule information by a 0/1 detection.

According to this invention, the agent means deduces the rule information to evaluate the deduction result by 0/1 detection, so that the registration, reference or receipt of the component information is capable of being easily and accurately performed without a manpower.

A ninth aspect on the invention provides the component managing control system according to the seventh aspect, wherein the agent means evaluates the deduction result of the rule information by a fuzzy detection from 0 to 1.

According to this invention, the agent means deduces the rule information to evaluate the deduction result by a fuzzy detection from 0 to 1, so that the registration, reference or receipt of the component information is capable of being easily and accurately performed with a detection closer to a man's detection.

A tenth aspect of the invention provides the component managing control system according to the ninth aspect, which comprises replacing means for repeatedly replacing a DTD information of the component information, which is described by the XML by using a predetermined method so that the evaluation value in the agent means becomes maximum or minimum, when the evaluation value does not satisfy a target value.

According to this invention, even if the evaluation value is under the desired value, the recomposition means repeatedly recomposes the DTD information so that this evaluation value becomes maximum or minimum. Therefore, the registration, reference or receipt of the component information is capable of being easily and accurately performed with a detection closer to a man's detection.

An eleventh aspect of the invention comprises a computer readable recording medium for recording a component managing control program applicable to a registration client, which is connected to the component information storage server for a storing a component information with respect to a wholeness of a hardware and a firmware to compose a product and the rule information storage server for storing a rule information upon registering the component information in the component information storage server via the network. Said computer readable recording medium records the component managing control program to make the computer execute registration step for registering the component information in the component information storage server on the basis of the rule information, which is derived from the rule information storage server.

According to this invention, in the registration step, the rule information is derived from the rule information storage server to register the component information in the component information storage server on the basis of this rule information. Accordingly, compared with a conventional case that the registrant makes reference to the registration rule, which is described on the document, and registers it, the registration of the component information is capable of being performed more easily and accurately.

A twelfth aspect of the invention comprises a computer readable recording medium for recording a component managing control program applicable to a reference/receiving client, which is connected to the component information storage server for a storing a component information with respect to a wholeness of a hardware and a firmware to compose a product and the rule information storage server for storing a rule information upon making reference to/receiving the component information in the component information storage server via the network. Said computer readable recording medium records the component managing control program to make the computer execute reference/receiving step for making reference to/receiving the component information in the component information storage server on the basis of the rule information, which is derived from the rule information storage server.

According to this invention, in the reference/receipt step, the rule information is derived from the rule information storage server to make reference to/receive the component information from the component information storage server on the basis of this rule information. Accordingly, compared with a conventional case that the registrant/receiptor makes reference to the reference/receipt rule, which is described on the document, and makes reference to/receives it, the reference/receipt of the component information is capable of being performed more easily and accurately.

Other objects and features of this invention will become understood from the following description with reference to the accompanying drawings.

BRIEF DESCRIPTION OF THE DRAWINGS

FIGS. 4A to 4C are an explanatory view illustrating a specific example of the layered construction of the identical embodiment;

FIGS. 12A to 12B are an explanatory view illustrating a rule applicable method with respect to the identical embodiment;

DESCRIPTION OF THE PREFERRED EMBODIMENTS

An embodiment of the component managing control system and the computer-readable recording medium to record the component managing control program according to the present invention will more fully be apparent from the following detailed description with accompanying drawings.

Figure 1:
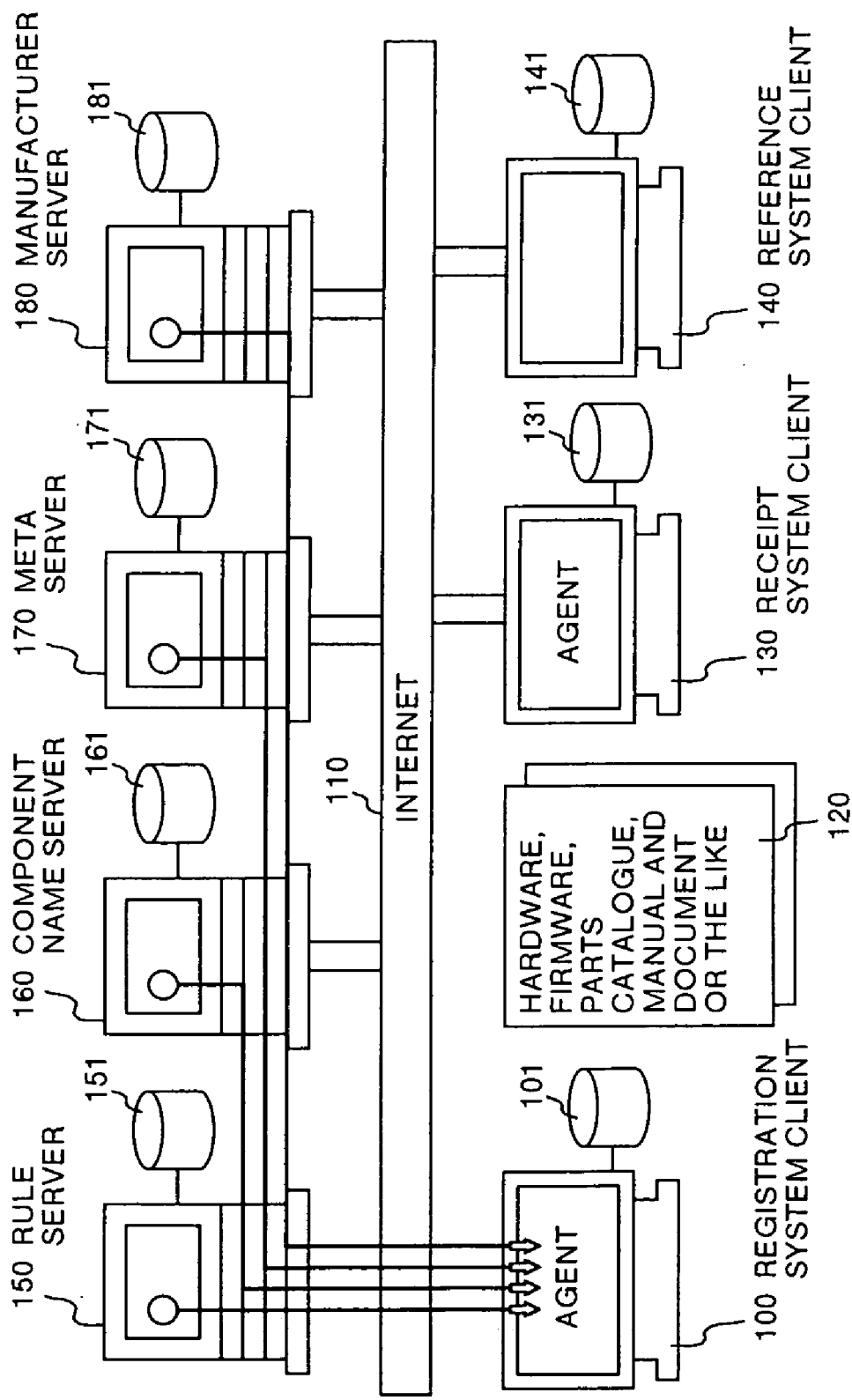
FIG. 1 is a block diagram showing a constitution of an embodiment of the present invention.

FIG. 1 is a block diagram showing a constitution of an embodiment of the present invention. In FIG. 1, a registration system client 100 is connected to internet 110 and has a function to register an information related to a component 120 (hereinafter, referred to as a component information) by an agent processing based on a registration rule information, to be described later, in place of a conventional registrant. The component information is subjected to be registered, made reference to and received and comprises a document the above described source code and the object code of the firmware and the parts catalogue and the manual of the hardware or the like with a layered construction. Further, a storage device 101 is connected to the registration system client 100.

Figure 2:
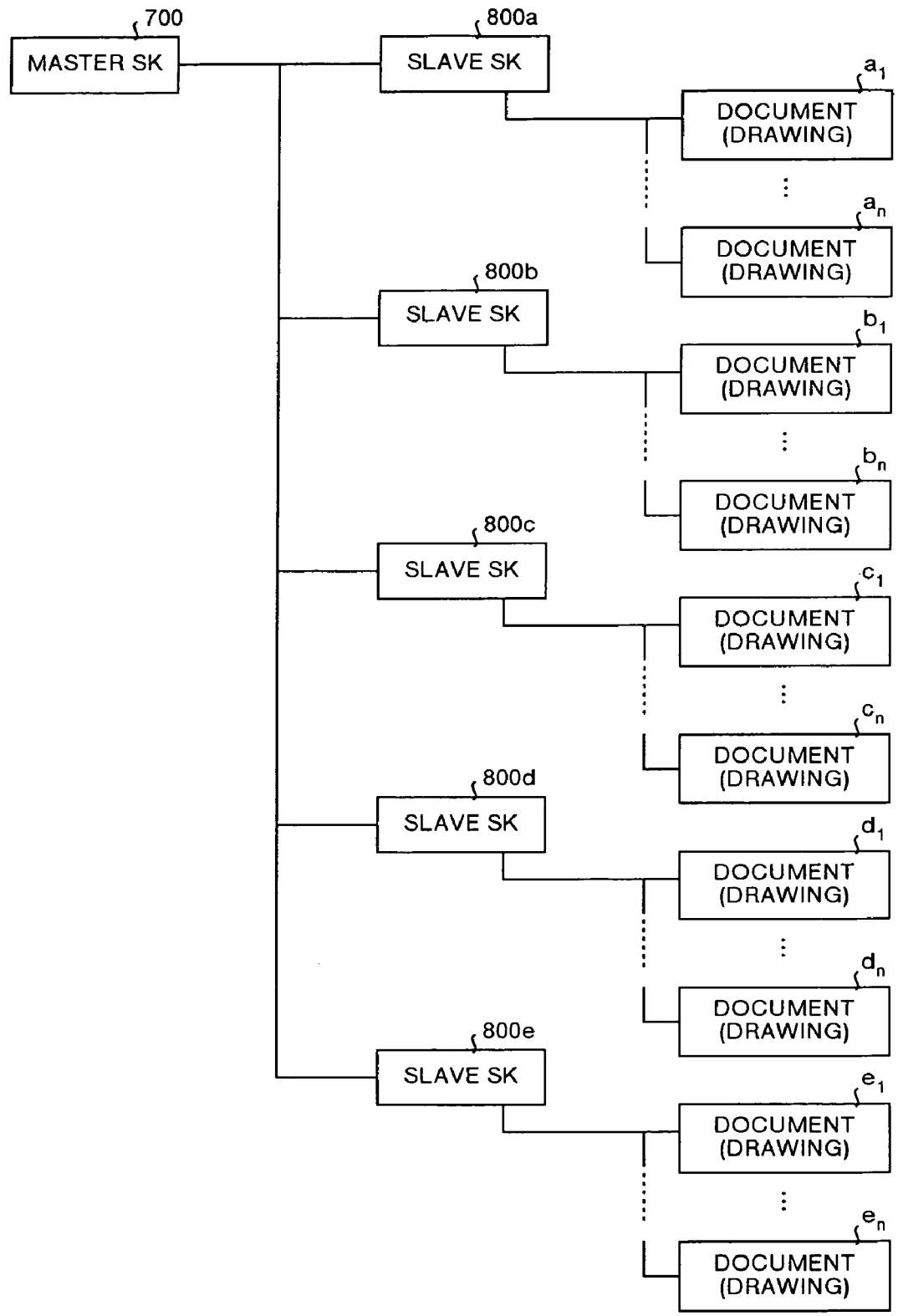
FIG. 2 shows a relation between a master SK and a slave SK in the identical embodiment.
Figure 3:
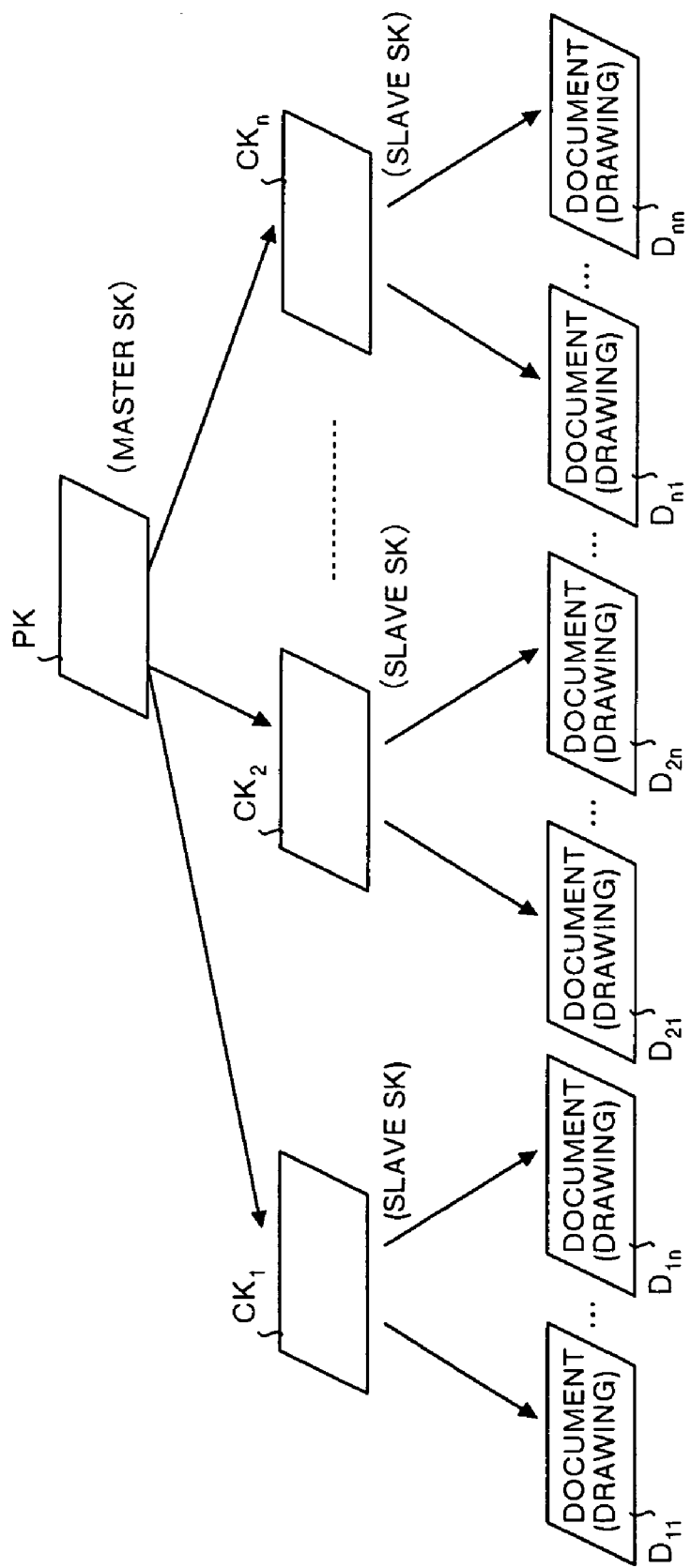
FIG. 3 shows a layered construction of the identical embodiment.

With reference to FIGS. 2 through 4, the layered construction of the embodiment of the present invention will be explained below. FIG. 2 shows a relation between a master SK (parts list) and a slave SK in the identical embodiment. In FIG. 2, the master SK 700 comprises a master drawing (a component information). The slave SK 800a through 800e (a component information) belong to the master SK 700, respectively. The slave SK 800a through 800e correspond to "a print board and a device mounting structural drawing", "an analog circuit drawing", "a print board mounting drawing", "a parts drawing" and "a logical circuit drawing" or the like as a slave drawing. Further, the slave SK 800a is composed of documents $a_1$ to $a_n$ on the nth page. In the same way, the slave SK 800e is composed of documents $e_1$ to $e_n$ on the nth page.

The layered construction shown in FIG. 2 corresponds to a managing information PK as the master SK (see FIG. 2) shown in FIG. 3, managing information $CK_1$ to $C_{Kn}$ as the slave SK (see FIG. 2), which are belonged to this managing information PK, respectively and documents $D_{l1}$ to $D_{ln}$ through documents $D_{n1}$ to $D_{nn}$, which link to these managing information $CK_1$ to $CK_n$, respectively.

FIGS. 4A to 4C are explanatory views illustrating a specific example of the layered construction of the identical embodiment. In FIGS. 4A to 4C, a disk control unit is illustrated as an example of electronic appliances. As shown in FIG. 4B, in the disk control unit, at least parts given by the parts number QXY118, TX220-2 and 7800A (for example, a firmware) are included. A parts constitution list 200 showing "a parts number", "a parts name", "a number of edition" and "a name of a manufacture" of these parts in FIG. 4A. Further, in the embodiment, this parts constitution list 200 is used as a parts construction list 220, which is described in the XML (extensible Markup Language) shown in FIG. 4C.

In FIG. 1, a receipt system client 130 is connected to the internet 110 and has a function to receive the registered component 120 by the agent processing based on a receipt rule, to be described later, information in place of a conventional receiptor. The storage device 131 is connected to the receipt system client 130. A reference system client 140 is connected to the internet 110 and has a function to make reference to the registered component 120 by the agent processing based on a reference rule information, to be described later, in place of a conventional user to make reference to the information. A storage device 141 is connected to this reference system client 140.

Figure 15:
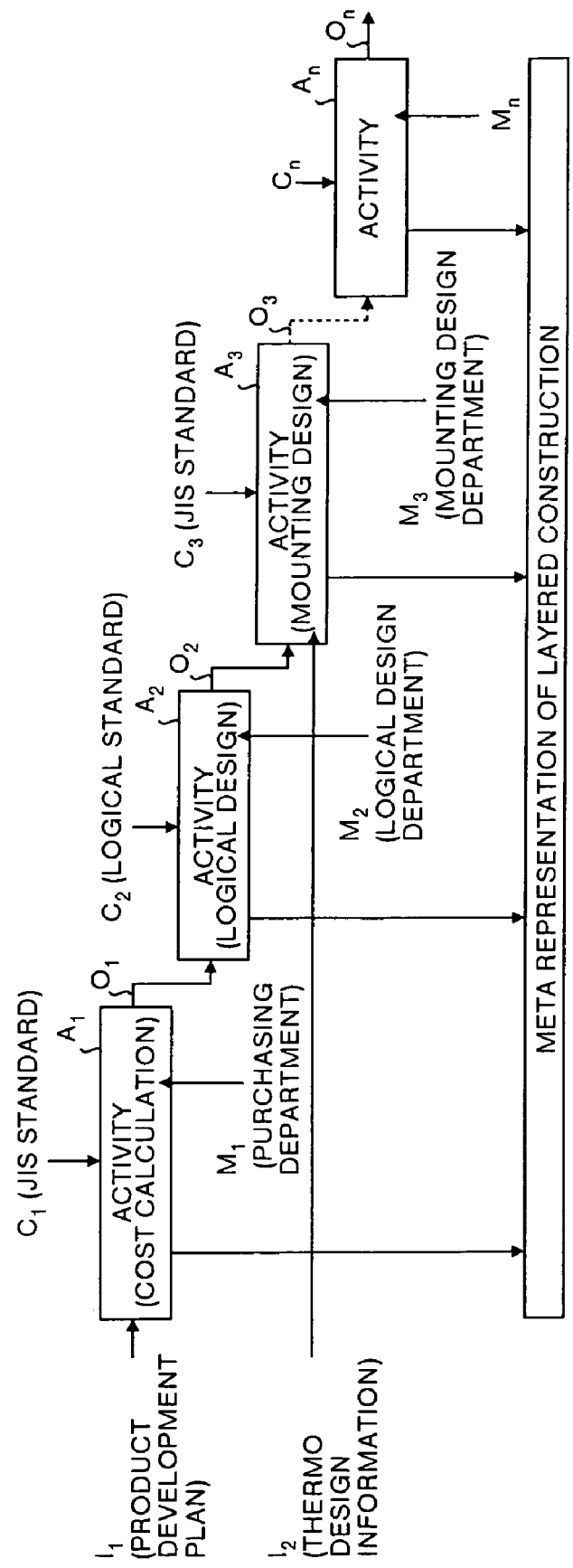
FIG. 15 is an explanatory view illustrating a conventional rule applicable method with respect to designing and manufacturing of the commodities.

A rule server 150 stores the above described registration rule information, the receipt rule information and the reference rule information, which are converted and compiled to a procedural language (for example, a JAVA language and a C++ language) via an agent rule language shown in FIG. 12A. In this FIG. 12A, the items corresponding to the items in FIG. 15 are represented by the same reference numerals as those of FIG. 15. The agent rule language comprises a language for converting the registration rule information, the receipt rule information and the reference rule information into the JAVA language and the C++ language.

Further, as shown in FIG. 12B, for example, with respect to the print board, in the XML file $F_1$, a tag <parts> is defined by a DTD file $F_2$ and the contents of a tag <processing> (a rule information) is represented by the JAVA file $F_3$. These registration rule information, the receipt rule information and the reference rule information are obtained by showing the information representing registration procedure of the component 120 by a if/then format, respectively. Examples of the registration rule, the reference rule and the receipt rule are shown below.

(a registration rule 1)
if: a security segment of this component is in X class? then: this component may be registered
end (a registration rule 2)
if: this component has a correct title panel?
then: this component may be registered
end
. . .

(a registration rule n)
if: this component is related to a hardware?
then: a DTD (Document Type Definition) for the hardware may be registered
end (a reference rule 1)
if: this component is permitted to be made reference to?
then: this component may be made reference to (a reference rule 2)
if: a purchasing department makes reference to this component?
then: the DTD of the purchasing department may be employed.
. . .

(a reference rule n)
if: a manufacturing department makes reference to this component?
then: the DTD of the manufacturing department may be employed.

(a receipt rule 1)
if: this component is permitted to be received?
then: this component may be received (a receipt rule 2)
if: a purchasing department receives this component?
then: the DTD of the purchasing department may be employed.
. . .

(a receipt rule n)
if: a manufacturing department receives this component?
then: the DTD of the manufacturing department may be employed.

A component name server 160 stores a name of a component information (hereinafter, referred to as a component name information), an attributes of a component information and a storage address of a component information or the like in a storage device 161. The component name server 160 is connected to the internet 110. A meta server 170 stores a meta information showing a layered construction between the component information (a cross relationship). The meta server 170 is connected to the internet 110. This meta information is obtained by representing the layered construction of the component by the DTD in the XML. This DTD is created broadly by three categories, namely, a category for registration, a category for making reference and a category for receiving. Further, for every category, the DTD is created by respective departments, namely, a designing department, a manufacturing department, a purchasing department, a cost managing department, a maintenance department and a quality managing department.

A manufacturer server 180 stored the component information itself in a storage device 181. In fact, a plurality of manufacturer servers 180 is provided to be distributed to respective departments and the enterprises exploiting the outsourcing or the like. In other words, various component information is distributed to the manufacturer servers 180 in the locations, where the information is created, and is stored therein.

Figure 5:
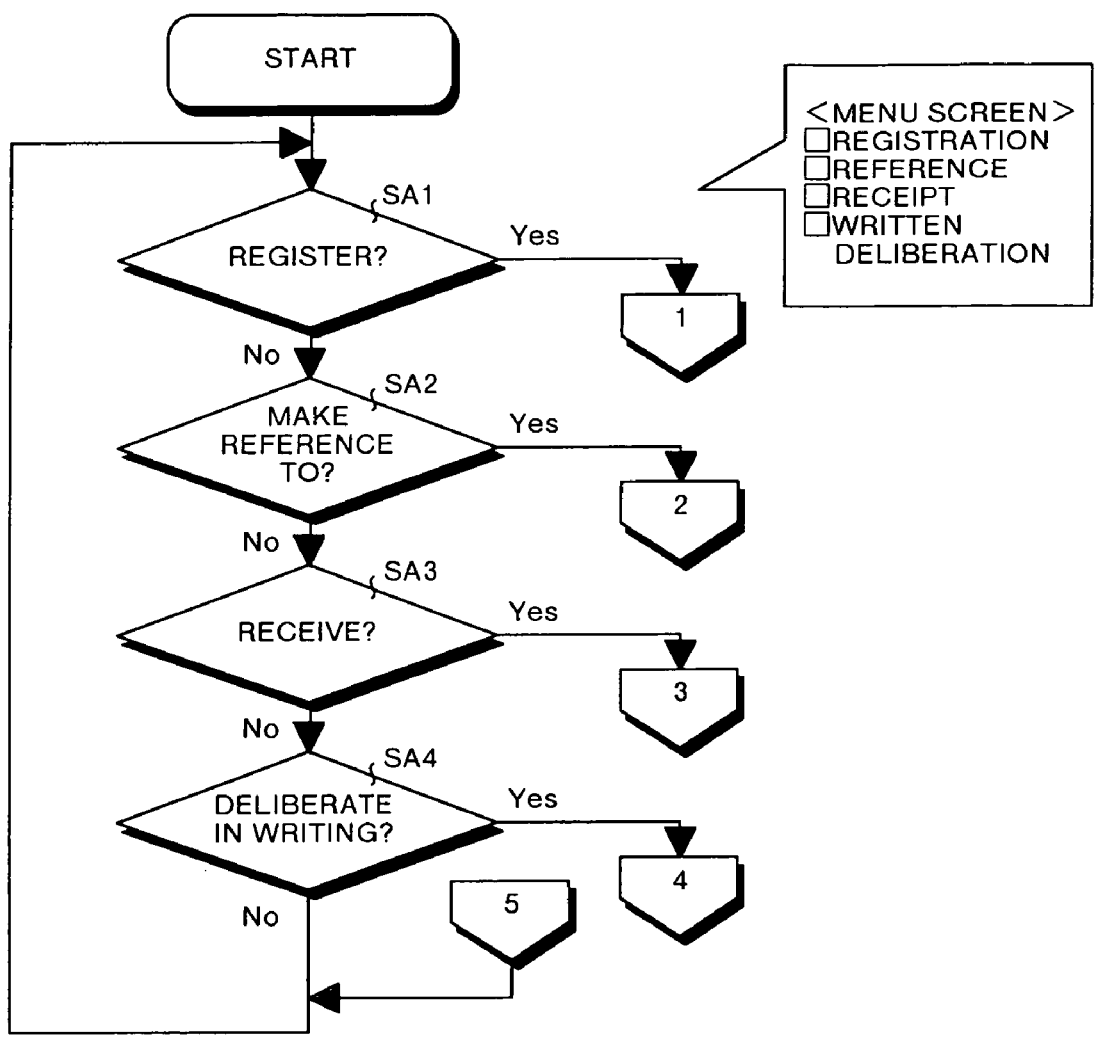
FIG. 5 is a flow chart illustrating a whole processing of the identical embodiment.

Then, the operation of the above described embodiment is explained with reference to flow charts shown in FIGS. 5 to 11. On the respective displays of the registration system client 100, the receipt client system 130 and the reference system client 140 shown in FIG. 1, a menu for selecting events (registration, reference, receipt and written deliberation) is displayed as shown in FIG. 5.

If "registration" is selected in the registration system client 100, the registration system client 100 determines the detection result of step SA1 as "Yes". In other words, the registration system client 100 executes an electronic information relating to a drawing such as a circuit diagram and a structural drawing or the like, an information relating to respective EC forms (new design notification, design revision notification), an information relating to a program or a registration processing (agent processing) shown in FIG. 6 for registering the component with the layered construction such as an electronic information relating to respective manuals.

Figure 6:
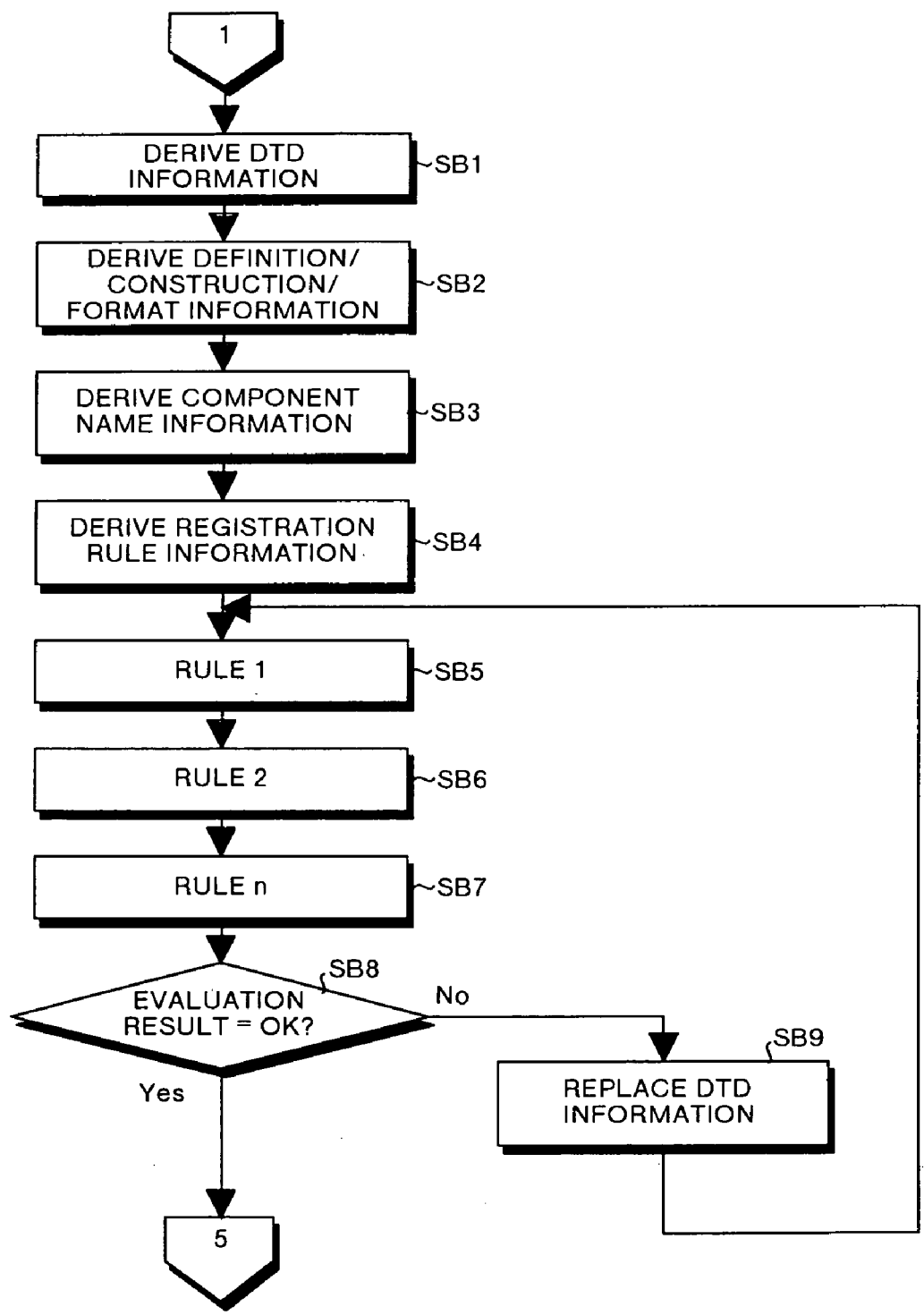
FIG. 6 is a flow chart illustrating a registration processing of the identical embodiment.

In other words, in step SB1 shown in FIG. 6, the registration system client 100 derives the DTD information for the designing department from the meta server 170. In step SB2, the registration system client 100 derives the definition/constitution/format information relating to the component from the meta server 170. In step SB3, the registration system client 100 derives the component name information from the component name serer 160. In step SB4, the registration system client 100 derives the registration rule information from the rule server 150.

In the steps SB5 to SB7, the registration system client 100 makes a deduction of the registration rule information by using a deduction method of the if/then production rule or the like. For example, in the steps SB5 to SB7, the registration system client 100 performs the deduction processing on the basis of the following registration rules 1 to n.

(a registration rule 1)
if: a security segment of this component is in X class? then:
   this component may be registered
end (a registration rule 2)
if: this component has a correct title panel?
then: this component may be registered
end (a registration rule n)
if: this component is related to a hardware?
then: a DTD for the hardware may be registered
end Then, with reference to FIG. 9, a deduction processing will be explained. In step SE1 shown in FIG. 9, the registration system client 100 derives a front part of the registration rule (if part). In step SE2, the registration system client 100 derives a back part of the registration rule (then part). In step SE3, the registration system client 100 detects whether the if part satisfies a first condition or not. If the detection result is "Yes", the registration system client 100 determines a crisp value C (A) as 1.

On the other hand, if the detection result of the step SE3 is "No", in step SE4, the registration system client 100 detects whether a membership function $\mu$ (A) satisfies a second condition or not. If the detection result is "Yes", in step SE5, the registration system client 100 determines the membership function $\mu$ (A) as a value at a midpoint in between 0 and 1.

Figure 11:
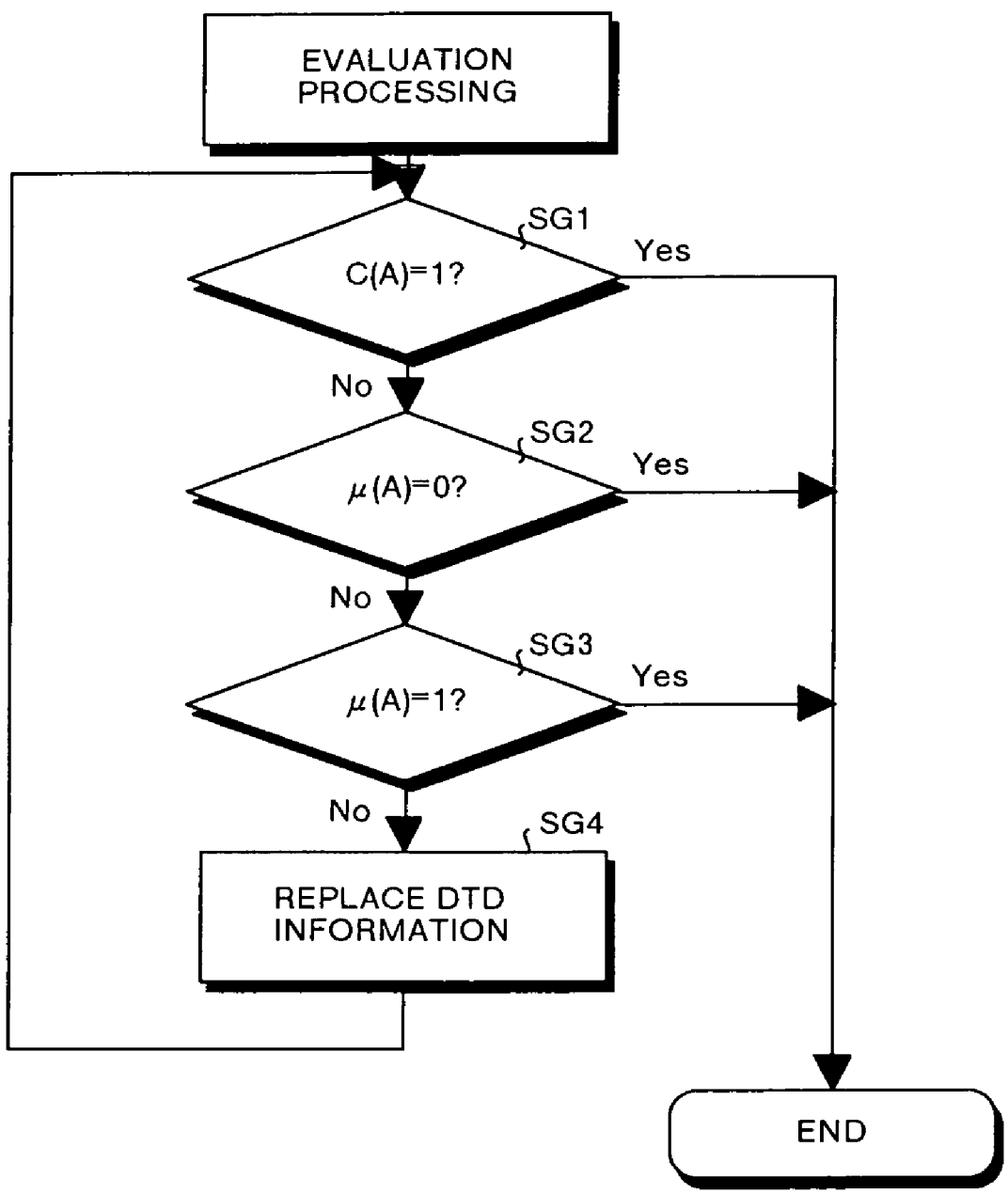
FIG. 11 is a flow chart illustrating an evaluation processing of the identical embodiment.
Figure 13:
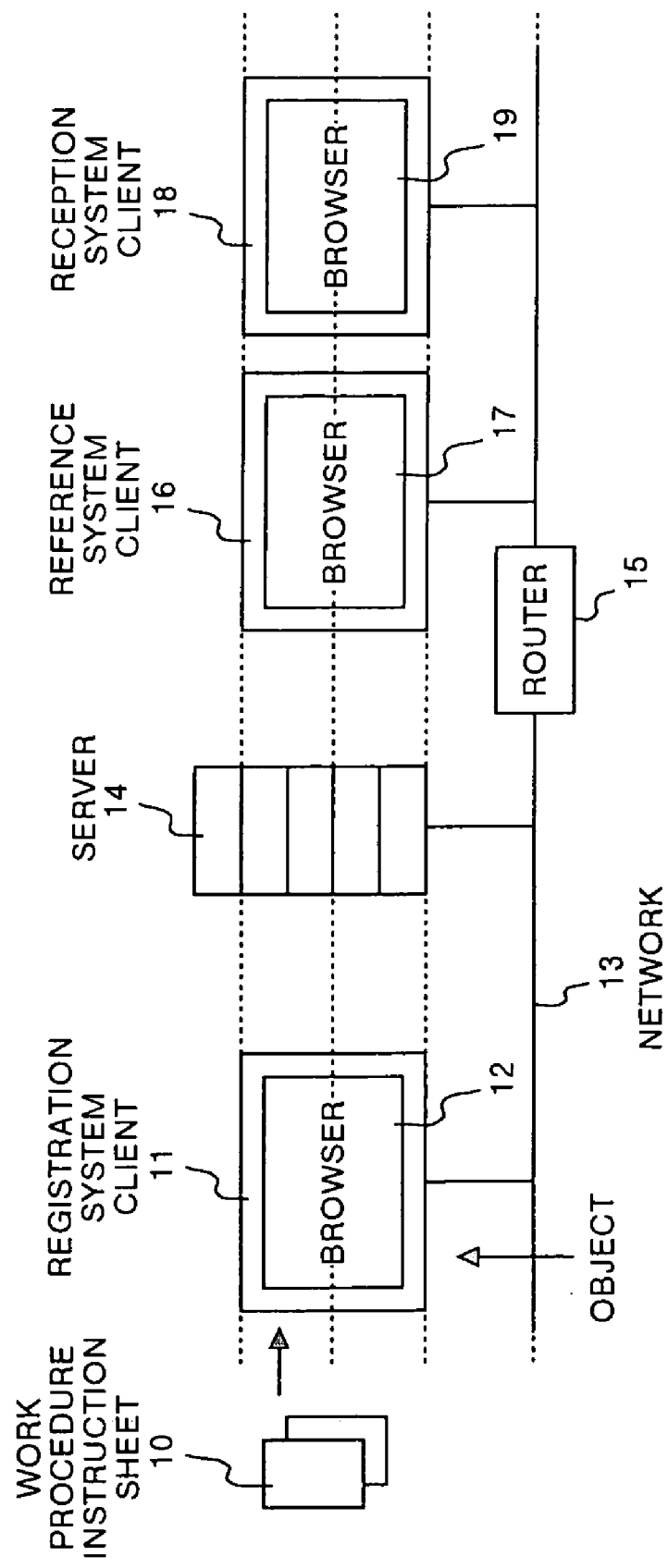
FIG. 13 is a block diagram showing a schematic constitution of a conventional component managing control system.
Figure 14:
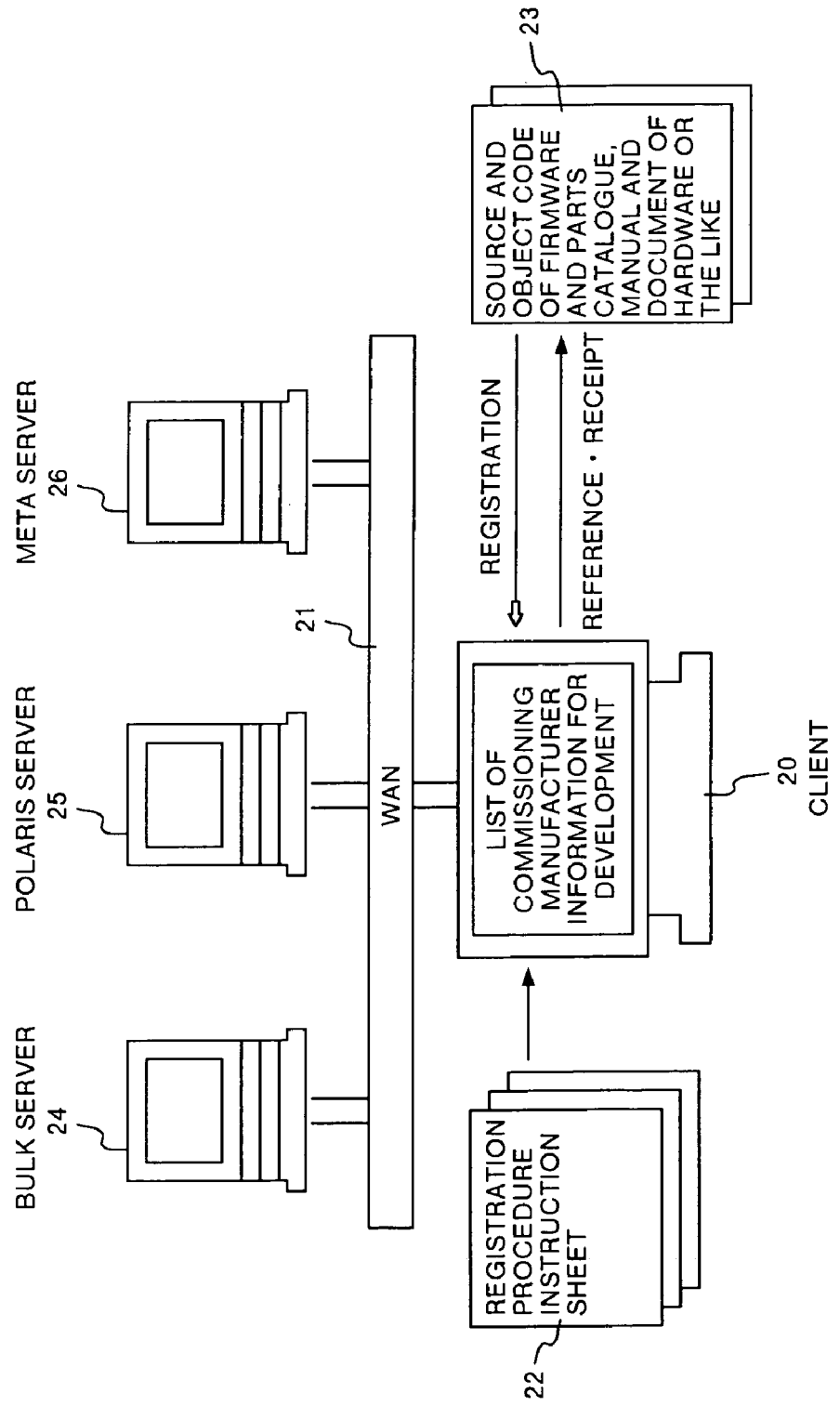
FIG. 14 is a block diagram showing a specific constitution of a conventional component managing control system.

In FIG. 6, in step S8, the registration system client 100 detects whether an evaluation result is ok or not on the basis of an evaluation processing shown in FIG. 11. In step SG1 shown in FIG. 11, the registration system client 100 detects whether the crisp value C (A) is 1 or not. If this detection result is "No", in step SG2, the registration system client 100 detects whether the membership function $\mu$ (A) is 0 or not. If this detection result is "No", in step SG3, the registration system client 100 detects whether the membership function $\mu$ (A) is 1 or not. If this detection result is "No", in step SG4, the registration system client 100 recomposes the DTD information.

In FIG. 6, in step SB8, the registration system client 100 detects whether the evaluation result is a ok target value is equal to the evaluation result or not, this detection result is "Yes", the current component is registered in the storage device 181 of the manufacturer server 180. On the other hand, the detection result in the step SB8 is "No", after recomposing the DTD information so that the evaluation result takes the minimum value or the maximum value, the registration system client 100 repeats the processing after the step SB5.

If "reference" is selected in the reference system client 140, the reference system client 140 determines the detection result of step SA2 as "Yes". In other words, the reference system client 140 executes an electronic information relating to a drawing such as a circuit diagram and a structural drawing or the like, an information relating to respective EC forms (new design notification, design revision notification), an information relating to a program or a reference processing (agent processing) shown in FIG. 7 for making reference to the component with the layered construction such as an electronic information relating to respective manuals.

Figure 7:
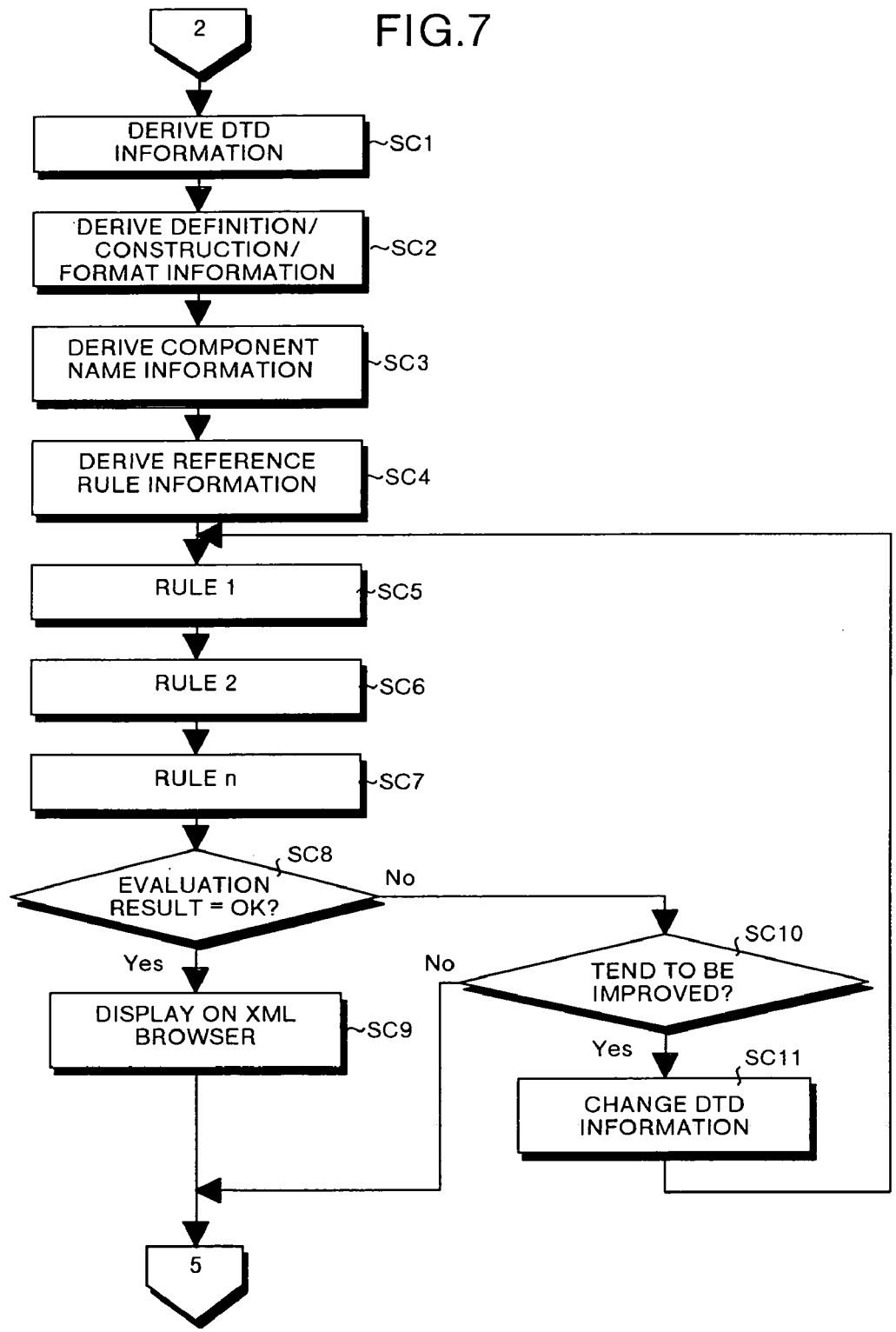
FIG. 7 is a flow chart illustrating a reference processing of the identical embodiment.

In other words, in step SC1 shown in FIG. 7, the reference system client 140 derives the DTD information for the designing department from the meta server 170. In step SC2, the reference system client 140 derives the definition/constitution/format information relating to the component from the meta server 170. In step SC3, the reference system client 140 derives the component name information from the component name serer 160. In step SC4, the reference system client 140 derives the reference rule information from the rule server 150.

In the steps SC5 to SC7, the reference system client 140 makes a deduction of the reference rule information by using a deduction method of the if/then production rule or the like. For example, in the steps SC5 to SC7, the reference system client 140 performs the deduction processing on the basis of the following reference rules 1 to n.

(a reference rule 1)
If: this component is permitted to be made reference to?
then: this component may be made reference to (a reference rule 2)
if: a purchasing department makes reference to this component?
then: the DTD of the purchasing department may be employed.

. . .

(a reference rule n)
if: a manufacturing department makes reference to this component?
then: the DTD of the manufacturing department may be employed.

Figure 9:
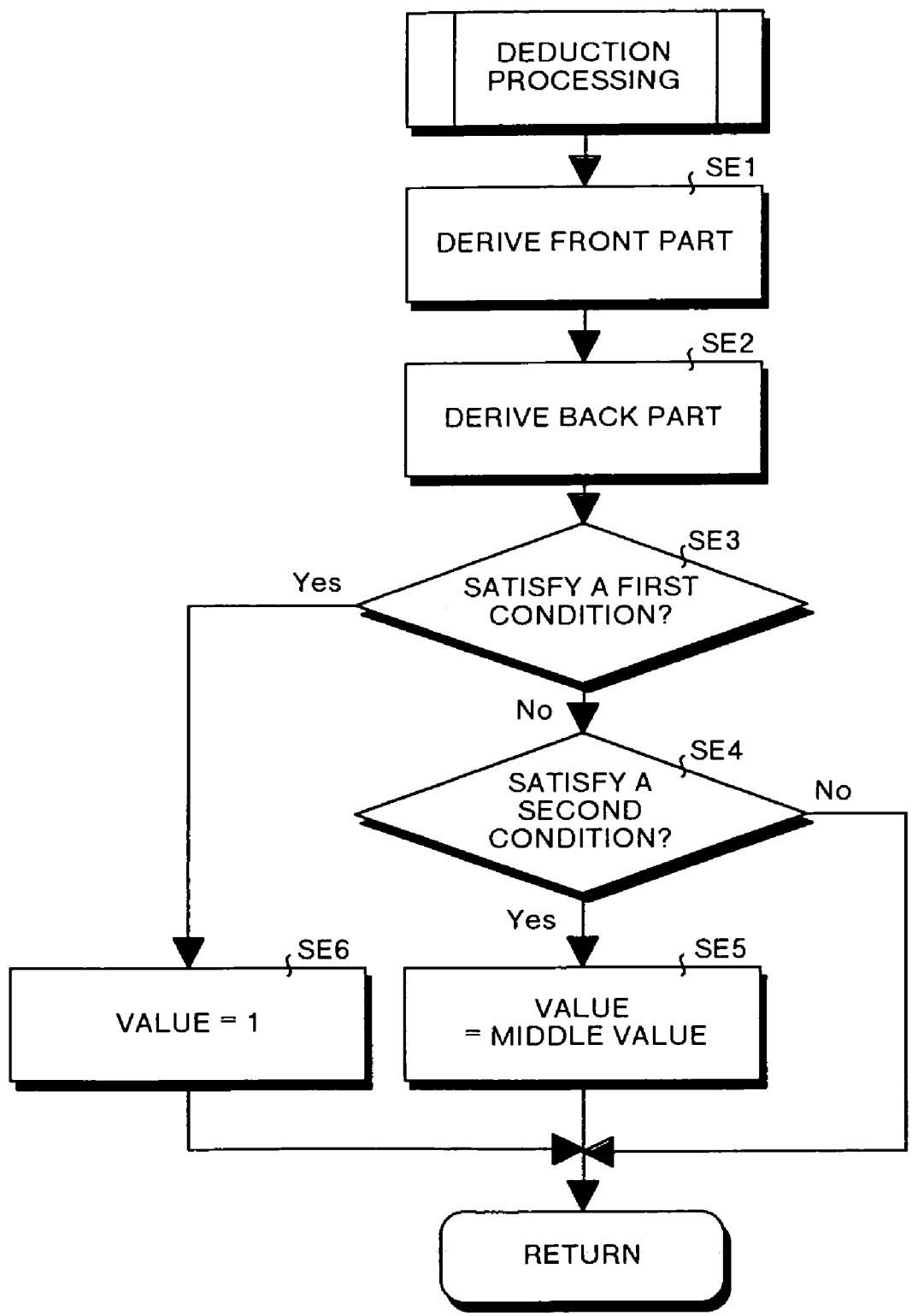
FIG. 9 is a flow chart illustrating a deduction processing of the identical embodiment.
Figure 10:
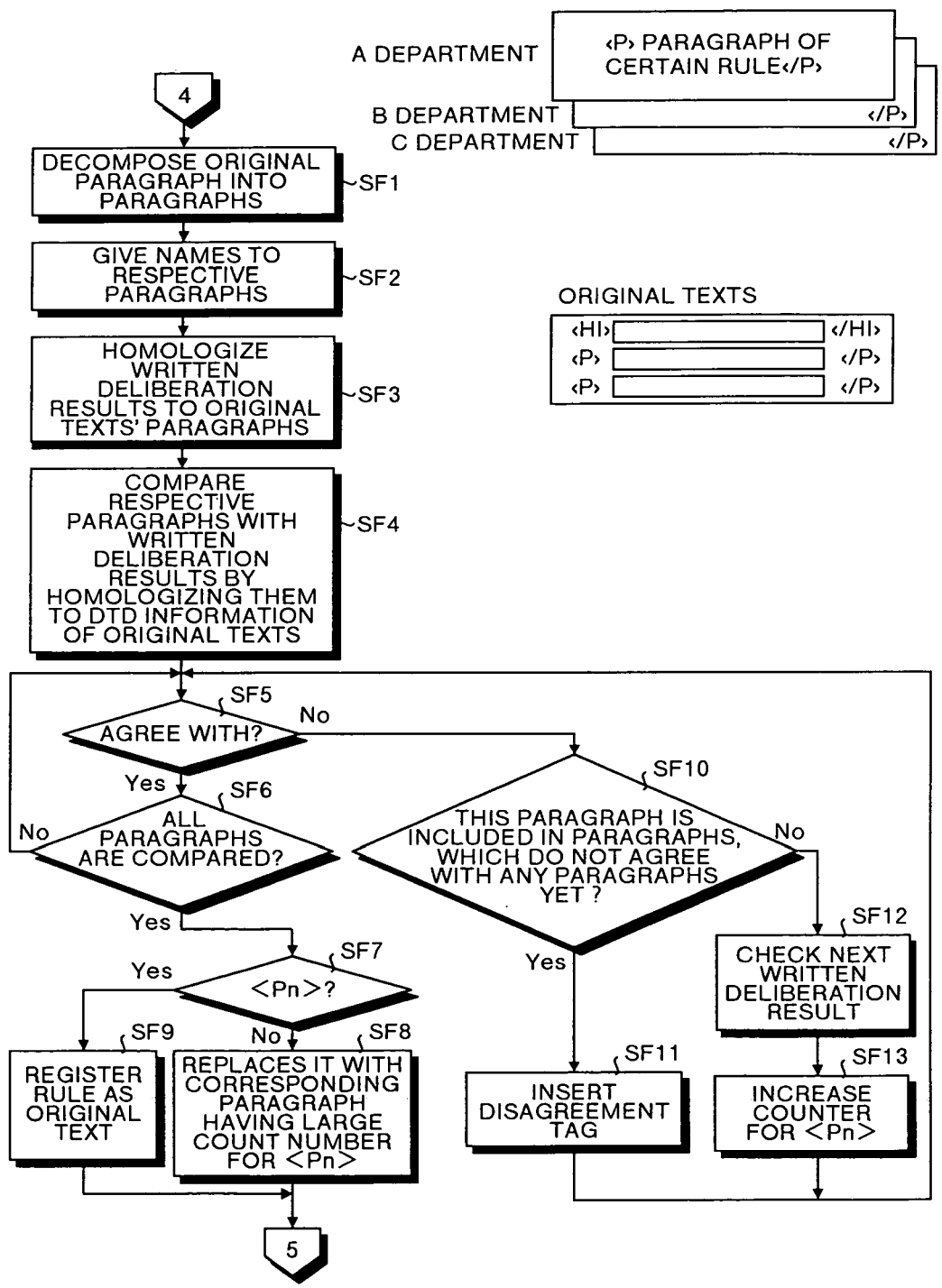
FIG. 10 is a flow chart illustrating a written deliberation processing of the identical embodiment.

Then, the reference system client 140 effects the deduction processing on the basis of the reference rules 1 to n with reference to above described FIG. 9. In step SC8, the reference system client 140 detects whether the evaluation result is ok or not on the basis of the evaluation result shown in FIG. 11 as same as in the SB8. If this detection result is "Yes", in step SC9, the reference system client 140 makes reference to the component by displaying the current component registered in the manufacturer server 180 on the XML browser.

On the other hand, if the detection result of the step SC8 is "No", in step SC10, the reference system client 140 detects whether the evaluation result tends to be improved compared with the former evaluation result or not. If this detection result is "Yes", in step SC11, after changing the DTD information, the reference system client 140 repeats the processing after the step SC5.

Further, if the receipt system client 130 is selected "receipt", the receipt system client 130 determines the detection result in step SA3 as "Yes". On this account, the receipt system client 130 executes an electronic information relating to a drawing such as a circuit diagram and a structural drawing or the like, an information relating to respective EC forms (new design notification, design revision notification), an information relating to a program or a receipt processing (agent processing) shown in FIG. 8 for receiving the component with the layered construction such as an electronic information relating to respective manuals.

Figure 8:
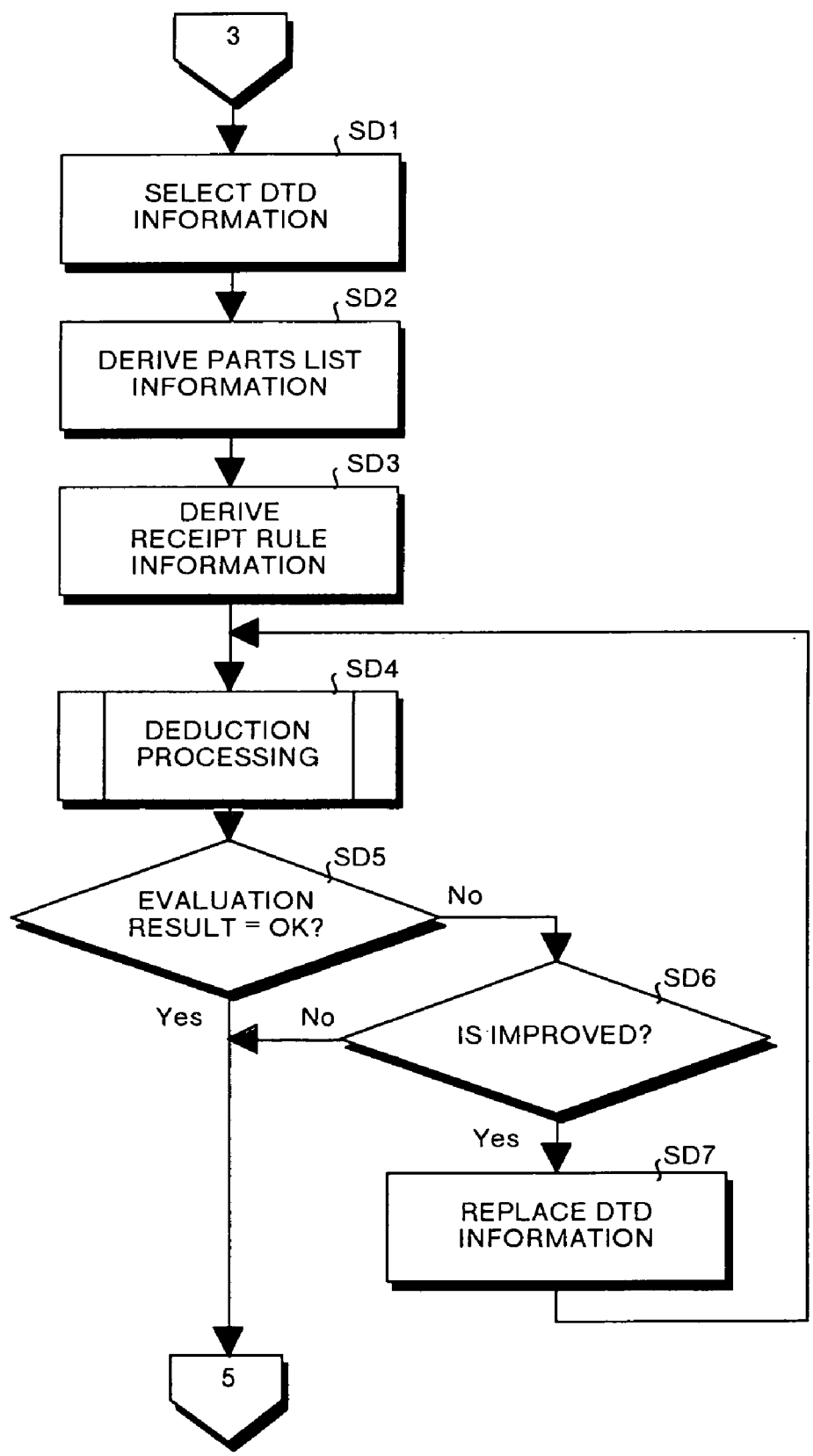
FIG. 8 is a flow chart illustrating a receipt processing of the identical embodiment.

In other words, in step SD1 shown in FIG. 8, the receipt system client 130 derives from the meta server 170 any one DTD information from respective DTD information for the designing department, the manufacturing department, the purchasing department, the cost managing department, the maintenance department, the quality assurance department or the like and further derives the definition/constitution/format information from this DTD information. In step SD2, the receipt system client 130 derives the parts list information from the component name server 160.

In step SD3, the receipt system client 130 derives the receipt rule information from the rule server 150. In step SD4, the receipt system client 130 performs the deduction processing shown in FIG. 9 by using the deduction method or the like of the if/then production rule to make deduction of the receipt rule information. For example, the receipt system client 130 performs the deduction processing on the basis of the following receipt rules 1 to n.

(a receipt rule 1)
if: this component is permitted to be received?
then: this component may be received (a receipt rule 2)
if: a purchasing department receives this component?
then: the DTD of the purchasing department may be employed.
. . .

(a receipt rule n)
if: a manufacturing department receives this component?
then: the DTD of the manufacturing department may be employed.

Then, in step SD5 shown in FIG. 8, the receipt system client 130 detects whether the evaluation result is ok or not on the basis of the evaluation processing shown in FIG. 11 as same as in the step SB8. If this detection result is "Yes", the receipt system client 130 receives the current component from the manufacturer server 180. On the other hand, if the detection result of the step SD5 is "No", in step SD6, the receipt system client 130 detects whether the evaluation result tends to be improved compared with the former evaluation result or not. If this detection result is "Yes", in step SD7, after recomposing the DTD information, the receipt system client 130 repeats the processing after the step SD4.

Further, the above described registration rules, the reference rules and the receipt rules (hereinafter, simply referred as to rules) are deliberated in writing by the persons in charge of respective department before being stored in the rule server 150. The rules reflect the result from the written deliberation and they are stored in the rule server 150. A processing of the written deliberation to make reflect the result from the written deliberation on the registration rules, the reference rules and the receipt rules will be explained below.

When "written deliberation" is selected in the registration system client 100, the registration system client 100 determines the detection result in the step SA4 shown in FIG. 5 as "Yes". Thus, the registration system client 100 executes the processing of the written deliberation shown in FIG. 10. In other words, in step SF1 shown in FIG. 10, the registration system client 100 decomposes the original texts of the rules into some paragraphs.

In step SF2, the registration system client 100 gives names to the decomposed paragraphs, respectively. In step SF3, the registration system client 100 homologizes respective written deliberation results from respective departments (for example, A department, B department, C department) to the discomposed paragraph (of the original texts). In step SF4, the registration system client 100 compares respective paragraphs with respective paragraphs of the written deliberation results by homologizing them to the DTD information of the original texts.

In step SF5, the registration system client 100 detects whether as a result of comparison in the step SF4, respective paragraphs agree with the written deliberation results or not. If the detection result is "Yes", in step SF6, the registration system client 100 detects whether all paragraphs are compared with the paragraphs of the written deliberation results or not. If this detection result is "No", the registration system client 100 repeats the processing in the step SF5. If the detection result in the step SF5 is "No", in step SF10, the registration system client 100 detects whether this paragraph is included in the paragraphs, which do not agree with any paragraphs yet.

If the detection result in the step SF10 is "Yes", in step SF11, the registration system client 100 inserts a tag <Pm> . . . </Pm>, which represents a new disagreed paragraph in the original texts. In this case, "disagreement" is inserted in the tag <Pm> . . . </Pm>. On the other hand, if the detection result of the step SF10 is "No", in step SF12, the registration system client 100 checks the next written deliberation result (paragraph). In step SF13, the registration system client 100 increases a counter for calculating the tag <Pn>, which is given to the paragraph. Then, the registration system client 100 repeats the processing on and after the step SF5.

Then, if the detection result in the step SF6 is "Yes", in step SF7, the registration system client 100 detects whether the counter of <Pn> is 1 or not. If this detection result is "Yes", in step SF9, the registration system client 100 registered the rule as the original text in the rule server 150. On the other hand, in the case that the detection result of the step SF7 is "No", in step SF8, the registration system client 100 replaces the current paragraph of the original text with the corresponding paragraph of the written deliberation result and registers the rule after replacement in the rule server 150.

As explained above, according to the embodiment, the registration system client 100, the receipt system client 130 or the reference system client 140 derives the rule information from the rule server 150 and derives the meta information from the meta server 170 to register, receive or make reference to the component information on the basis of these rule information and meta information. Compared with the conventional case that the registrant, the receiptor or the person who makes reference registers, receives or makes reference to the registration rules, the receipt rules or the reference rules, which is described on the document while making reference to the registration rules, the receipt rules or the reference rules, it is possible to register, receive or make reference to more easily and accurately.

An embodiment of the present invention has been described in detail with reference to the accompanying drawings but it is to be understood that the practical arrangement is not limited to this specific embodiment, and that various design changes may be made without departing from the spirit and scope of the present invention. For example, in the above described embodiment, the computer readable recording medium may record the component managing control program to realize the above described functions and the component managing control program recorded in this recording medium may be read in the computer to execute the program.

This computer is composed of a CPU for executing the above component managing control program, an input device such as a key board and a mouse, a ROM-(Read Only Memory) for storing various data, a RAM (Random Access Memory) for storing an arithmetic parameter or the like, a reading device for reading the component managing control program from the recording medium, an output device such as a display and a printer or the like and a bus to connect respective units of the devices (all unillustrated).

The CPU reads the component managing control program, which is recorded in the recording medium, via the reading device. Then, the CPU executes the component managing control program to realize the above described functions. The recording medium may include a transmission medium such as a network to record a data temporally in addition to a transportable recording medium such as an optical disk, a floppy disk and a hard disk or the like.

As described above, according to the first aspect of the invention, the registration client derives the rule information from the rule information storage server to register the component information in the component information storage server on the basis of this rule information. Accordingly, compared with a conventional case that the registrant makes reference to the registration rule, which is described on the document, and registers it, the registration of the component information is capable of being performed more easily and accurately.

According to the second aspect of the invention, the component information is dispersed to be stored in the plural component information storage servers. Therefore, compared with the conventional case for centrally storing the information in one server, a required storage capacity of the storage device becomes smaller, so that the cost can be lowered.

According to the third aspect of the invention, at least a meta information having a layered construction of the component information is made to be stored in the meta information storage server so that the user is capable of easily and accurately registering the component information without considering the complicated layered construction.

According to the fourth aspect of the invention, the component information is capable of being described by an XML, so that various component information can be easily constructed due to the property of the XML.

According to the fifth aspect of the invention, the reference/receipt client derives the rule information from the rule information storage server to make reference to/receive the component information from the component information storage server on the basis of this rule information. Accordingly, compared with a conventional case that the registrant/receptor makes reference to the reference/receipt rule, which is described on the document, and makes reference to/receives it, the reference/receipt of the component information is capable of being performed more easily and accurately.

According to the sixth aspect of the invention, a deliberation result of a written rule as a source of the information rules is verified and the rule information in response to this verification result is made to be registered in the rule information storage server, so that the violation of the rule and the error or the like can be prevented compared with the case to register the information manually.

According to the seventh aspect of the invention, the agent means deduces the rule information, so that the registration, reference or receipt of the component information is capable of being easily and accurately performed without a manpower.

According to the eighth aspect of the invention, the agent means deduces the rule information to evaluate the deduction result by 0/1 detection, so that the registration, reference or receipt of the component information is capable of being easily and accurately performed without a manpower.

According to the ninth aspect of the invention, the agent means deduces the rule information to evaluate the deduction result by a fuzzy detection from 0 to 1, so that the registration, reference or receipt of the component information is capable of being easily and accurately performed with a detection closer to a man's detection.

According to the tenth aspect of the invention, even if the evaluation value is under the desired value, the recomposition means repeatedly recomposes the DTD information so that this evaluation value becomes maximum or minimum. Therefore, the registration, reference or receipt of the component information is capable of being easily and accurately performed with a detection closer to a man's detection.

According to the eleventh aspect of the invention, in the registration step, the rule information is derived from the rule information storage server to register the component information in the component information storage server on the basis of this rule information. Accordingly, compared with a conventional case that the registrant makes reference to the registration rule, which is described on the document, and registers it, the registration of the component information is capable of being performed more easily and accurately.

According to the twelfth aspect of the invention, in the reference/receipt step, the rule information is derived from the rule information storage server to make reference to/receive the component information from the component information storage server on the basis of this rule information. Accordingly, compared with a conventional case that the registrant/receptor makes reference to the reference/receipt rule, which is described on the document, and makes reference to/receives it, the reference/receipt of the component information is capable of being performed more easily and accurately.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A document managing control system comprising:
    a document information storage server which stores a document information related to a hardware and a firmware to compose an electronic product;
    a rule information storage server which stores a rule information on registering said document information in said document information storage server;
    an agent deducing said rule information and evaluating a deduction result as an evaluation value of said rule information by a fuzzy detection from 0 to 1;
    a registration client, which is connected to said document information storage server and said rule information storage server via a network, which registers said document information in said document information storage server according to said rule information derived from said rule information storage server; and
    a replacer repeatedly replacing a document type definition (DTD) information of said document information, which is described by an XML, by using a predetermined method so that the evaluation value in said agent becomes maximum or minimum, when the evaluation value does not satisfy a target value.

2. The document managing control system according to claim 1, wherein a plurality of document information storage servers are provided and plural and various document information are distributed and stored in the plurality of document information storage servers, respectively.

3. The document managing control system according to claim 1, further comprising a meta information storage server, which is connected to said network, which stores a meta information having a layered construction of at least document information; wherein said registration client registers said meta information in said meta information storage server and identifies said document information according to the meta information to register the document information in said document information storage server based upon the rule information.

4. The document managing control system according to claim 1, said registration client registers said document information, which is described by an XML.

5. The document managing control system according to claim 1, further comprising a rule verifier verifying a deliberation result of a written rule, which is a source of said rule information, and registering a rule information in response to the verification result in said rule information storage server.

6. The document managing control system according to claim 1, wherein said agent evaluates a deduction result as an evaluation value of said rule by a 0/1 detection.

7. A document managing control system comprising:
   a document information storage server which stores a document information related to a hardware and a firmware to compose an electronic product;
   a rule information storage server which stores a rule information on making reference to/receiving said document information from said document information storage server;
   an agent deducing said rule information and evaluating a deduction result as an evaluation value of said rule information by a fuzzy detection from 0 to 1;
   a reference/receipt client, which is connected to said document information storage server and said rule information storage server via a network, which makes reference to/receiving said document information from said document information storage server according to said rule information derived from said rule information storage server; and
   a replacer repeatedly replacing a document type definition (DTD) information of said document information, which is described by an XML, by using a predetermined method so that the evaluation value in said agent becomes maximum or minimum, when the evaluation value does not satisfy a target value.

8. The document managing control system according to claim 7, further comprising a rule verifier verifying a deliberation result of a written rule, which is a source of said rule information, and registering a rule information in response to the verification result in said rule information storage server.

9. The document managing control system according to claim 7, wherein said agent evaluates a deduction result as an evaluation value of said rule information by a 0/1 detection.

10. A computer readable recording medium storing a document managing control program controlling a registration client, which is connected via a network to a document information storage server storing document information related to a hardware and a firmware to compose an electronic product and to a rule information storage server storing registration rules, according to a process comprising:
    registering said document information in said document information storage server based upon the registration rules from said rule information storage server;
    deducing said registration rules and evaluating a deduction result as an evaluation value of said registration rules by a fuzzy detection from 0 to 1; and
    repeatedly replacing a document type definition (DTD) information of said document information, which is described by an XML, by using a predetermined method so that the evaluation value in said agent becomes maximum or minimum, when the evaluation value does not satisfy a target value.

11. A computer readable recording medium storing a document managing control program controlling a reference/receiving client, which is connected via a network to a document information storage server storing document information related to a hardware and a firmware to compose an electronic product and to a rule information storage server storing registration rules on making reference to/receiving said document information, according to a process comprising:
    managing referencing/receiving of said document information in said document information storage server based upon the registration rules from said rule information storage server;
    deducing said registration rules and evaluating a deduction result as an evaluation value of said registration rules by a fuzzy detection from 0 to 1; and
    repeatedly replacing a document type definition (DTD) information of said document information, which is described by an XML, by using a predetermined method so that the evaluation value in said agent becomes maximum or minimum, when the evaluation value does not satisfy a target value.

* * * * *

UNITED STATES PATENT AND TRADEMARK OFFICE
CERTIFICATE OF CORRECTION

PATENT NO. : 6,983,302 B1  
APPLICATION NO. : 09/698200  
DATED : January 3, 2006  
INVENTOR(S) : Tadashi Ohashi Page 1 of 1

It is certified that error appears in the above-identified patent and that said Letters Patent is hereby corrected as shown below:

Column 17,
Line 9, after "claim 1" insert -- wherein --.

Column 18,
Lines 5 and 24, change "computer readable" to -- computer-readable --.

Signed and Sealed this

Twentieth Day of June, 2006

JON W. DUDAS
*Director of the United States Patent and Trademark Office*